US012809716B2

(12) United States Patent
Ranjan et al.

(10) Patent No.: US 12,809,716 B2
(45) Date of Patent: Nov. 24, 2026

(54) RUNTIME RESOLUTION OF A PROGRAMMATIC ERROR USING AN INTERNAL REQUEST RETRY

(71) Applicant: INTERNATIONAL BUSINESS MACHINES CORPORATION, Armonk, NY (US)

(72) Inventors: Paritosh Ranjan, Kolkata (IN); Sarika Sinha, Bangalore (IN); Prodip Roy, Kolkata (IN); Bhubaneswar Padhan, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/044,676

(22) Filed: Feb. 4, 2025

(65) Prior Publication Data

US 2026/0228082 A1 Aug. 6, 2026

(51) Int. Cl.

| | |
|---|---|
| ***G06F 11/07*** | (2006.01) |
| ***G06F 8/656*** | (2018.01) |
| ***G06F 8/71*** | (2018.01) |
| ***G06F 9/455*** | (2018.01) |
| ***G06F 11/14*** | (2026.01) |

(Continued)

(52) U.S. Cl.

CPC .......... *G06F 11/0793* (2013.01); *G06F 8/656* (2018.02); *G06F 8/71* (2013.01); *G06F 11/079* (2013.01); *G06F 11/1438* (2013.01); *G06F 11/1484* (2013.01); *G06F 11/3624* (2013.01); *G06F 9/455* (2013.01); *G06F 11/0712* (2013.01)

(58) Field of Classification Search

CPC ............... G06F 11/0793; G06F 11/079; G06F 11/3624; G06F 11/1438; G06F 11/1484; G06F 8/65; G06F 8/656

See application file for complete search history.

(56) References Cited

U.S. PATENT DOCUMENTS

| | | | | |
|---|---|---|---|---|
| 10,678,677 | B1 * | 6/2020 | Kuris | G06F 11/3698 |
| 11,157,390 | B2 | 10/2021 | Acharyya et al. | |

(Continued)

OTHER PUBLICATIONS

Peter-evans, "create-pull-request", Nov. 25, 2024, <https://github.com/peter-evans/create-pull-request/blob/28b3f122d69e5d02001a8608ddf946a915413d73/docs/examples.md> (Year: 2024).*

(Continued)

*Primary Examiner* — Bryce P Bonzo
*Assistant Examiner* — Albert Li
(74) *Attorney, Agent, or Firm* — CHIP LAW GROUP

(57) ABSTRACT

An approach is provided for a runtime resolution of a programmatic error in an application using an internal request retry. A client request is received, where the request is directed to an application programming interface (API) of a cloud native hosted in a container included in a pod or (ii) a monolithic application deployed in a virtual machine (VM). A failure of the API is detected due to a programmatic error in the cloud native or monolithic application. A fix of the programmatic error is generated in a source code of the cloud native or monolithic application. The fix is deployed in the container or VM. A component internal to the pod or VM retries the request to (i) the cloud native application corrected by the fix deployed in the container or (ii) the monolithic application corrected by the fix deployed in the VM.

17 Claims, 7 Drawing Sheets

(51) Int. Cl.
*G06F 11/1482* (2026.01)
*G06F 11/362* (2025.01)

(56) References Cited

U.S. PATENT DOCUMENTS

| | | | | |
|---|---|---|---|---|
| 11,573,848 | B2 | 2/2023 | Linck et al. | |
| 2004/0107416 | A1* | 6/2004 | Buban | G06F 8/656 717/170 |
| 2007/0074187 | A1* | 3/2007 | O'Brien | G06F 8/656 717/140 |
| 2017/0359400 | A1* | 12/2017 | Demulder | G06F 8/66 |
| 2021/0165647 | A1* | 6/2021 | Krishnamoorthy | G06N 3/09 |
| 2022/0091963 | A1* | 3/2022 | Mahajan | G06F 8/65 |
| 2022/0374289 | A1* | 11/2022 | Yuan | G06F 9/547 |
| 2023/0176837 | A1* | 6/2023 | Sethi | G06F 8/36 717/106 |
| 2023/0289523 | A1* | 9/2023 | Bavishi | G06F 8/427 |
| 2025/0094167 | A1* | 3/2025 | Verma | G06F 8/41 |

OTHER PUBLICATIONS

Codacy, "Pull Request Best Practices", Apr. 11, 2024, <https://blog.codacy.com/pull-request-best-practices> (Year: 2024).*

"Error!", https://exact.codes/bug-fixer, dated Mar. 28, 2025, 2 pages.

"What is Circuit Breaker Pattern in Microservices?", https://www.geeksforgeeks.org/what-is-circuit-breaker-pattern-in-microservices/, Oct. 22, 2024, 14 pages.

Andrew Whitechapel, "How to Restart your App Programmatically", https://blogs.windows.com/windowsdeveloper/2017/07/28/restart-app-programmatically/, Jul. 28, 2017, 7 pages.

AskCodi, "Code Fixer", https://www.askcodi.com/apps/code-fixer, dated Mar. 28, 2025, 1 page.

D. Husni Fahri Rizal, "Error Handling On Microservice", Medium, https://medium.com/the-legend/error-handling-on-microservice-a513f2c32079, May 21, 2021, 15 pages.

Github, "REST API endpoints for pull requests", https://docs.github.com/en/rest/pulls/pulls?apiVersion=2022-11-28#create-a-pull-request, dated Mar. 28, 2025, 26 pages.

Gokhan Simsek, "Improving Debugging Workflow in Cloud Native Environments", https://softwareengineeringdaily.com/2021/03/10/improving-cloud-workflow-in-cloud-native-environments/, Mar. 10, 2021, 11 pages.

IBM, "Code smarter, not harder: watsonx Code Assistant", dated Mar. 28, 2025, 4 pages.

IBM, "Edge Computing Solutions", https://www.ibm.com/edge-computing, dated Mar. 28, 2025, 4 pages.

IBM, "IBM Cloud Kubernetes Service", https://www.ibm.com/products/kubernetes-service, dated Mar. 28, 2025, 5 pages.

IBM, "IBM Cloud Satellite", https://www.ibm.com/products/satellite, dated Mar. 28, 2025, 4 pages.

IBM, "Red Hat OpenShift on IBM Cloud", https://www.ibm.com/products/openshift, dated Mar. 28, 2025, 5 pages.

IBM, "Serverless on IBM Cloud", https://www.ibm.com/products/code-engine, dated Mar. 28, 2025, 5 pages.

Mike Vizard, "Lightrun Adds Generative AI Tool to Debug Code in Runtime Environments", https://devops.com/lightrun-adds-generative-ai-tool-to-debug-code-in-runtime-environments/, Jul. 31, 2024, 1 page.

Sampaio Jr. et al., "Improving microservice-based applications with runtime placement adaptation", Journal of Internet Services and Applications, Feb. 26, 2019, 30 pages.

Sonar, "A developer's guide to AI-assisted software development", https://www.sonarsource.com/learn/ai-assisted-software-development/, dated Mar. 27, 2025, 13 pages.

Walker et al., "Automated Code-Smell Detection in Microservices Through Static Analysis: A Case Study", Applied Sciences, Nov. 3, 2020, 20 pages.

* cited by examiner

700

| Error Type | Language | Fixed by Component |
|---|---|---|
| Nullpointer | Language A | RuleEngine-LangA-Rule1 |
| Nullpointer | Language B | RuleEngine-LangB-Rule1 |
| Nullpointer | Language C | RuleEngine-LangC-Rule1 |
| Nullpointer | Language D | RuleEngine-LangD-Rule1 |
| SemiColonMissing | Language A | RuleEngine-LangA-Rule2 |
| SemiColonMissing | Language B | RuleEngine-LangB-Rule2 |
| SemiColonMissing | Language C | RuleEngine-LangC-Rule2 |
| SemiColonMissing | Language D | RuleEngine-LangD-Rule2 |
| Variable Not Initialized | Language A | RuleEngine-LangA-Rule3 |
| Variable Not Initialized | Language B | RuleEngine-LangB-Rule3 |
| Variable Not Initialized | Language C | RuleEngine-LangC-Rule3 |
| Variable Not Initialized | Language D | RuleEngine-LangD-Rule3 |
| Datatype Conversion Error | Language A | AIEngine-LangA-Rule-4 |
| Datatype Conversion Error | Language B | AIEngine-LangB-Rule-4 |
| Datatype Conversion Error | Language C | AIEngine-LangC-Rule-4 |
| Datatype Conversion Error | Language D | AIEngine-LangD-Rule-4 |
| Mismatched Parentheses | Language A | CoPilot-LangA-Rule-5 |
| Mismatched Parentheses | Language B | CoPilot-LangB-Rule-5 |
| Mismatched Parentheses | Language C | CoPilot-LangC-Rule-5 |
| Mismatched Parentheses | Language D | CoPilot-LangD-Rule-5 |
| Incorrect Arguments to Method | Language A | AIEngine-LangA-Rule-6 |
| Incorrect Arguments to Method | Language B | AIEngine-LangB-Rule-6 |
| Incorrect Arguments to Method | Language C | AIEngine-LangC-Rule-6 |
| Incorrect Arguments to Method | Language D | AIEngine-LangD-Rule-6 |
| Mismatched Quotes | Language A | RuleEngine-LangA-Rule7 |
| Mismatched Quotes | Language B | RuleEngine-LangB-Rule7 |
| Mismatched Quotes | Language C | RuleEngine-LangC-Rule7 |
| Mismatched Quotes | Language D | RuleEngine-LangD-Rule7 |

*FIG. 7*

RUNTIME RESOLUTION OF A PROGRAMMATIC ERROR USING AN INTERNAL REQUEST RETRY

BACKGROUND

The present invention relates to software applications, and more particularly to resolving programmatic errors in software applications.

SUMMARY

In one embodiment, the present invention provides a computer-implemented method. The method includes receiving a request from a client directed to an application programming interface (API) of (i) a cloud native application hosted in a container included in a pod or (ii) a monolithic application deployed in a virtual machine (VM). The method further includes, responsive to the request, detecting a failure of the API due to a programmatic error in the cloud native or monolithic application. The method further includes generating a fix of the programmatic error in a source code of the cloud native or monolithic application. The fix is changed code. The method further includes deploying the fix in the container or the VM. The method further includes retrying the request to (i) the cloud native application corrected by the fix deployed in the container or (ii) the monolithic application corrected by the fix deployed in the VM. The retrying is performed by a component internal to the pod or the VM.

A computer system and a computer program product corresponding to the above-summarized computer-implemented method are also described herein.

BRIEF DESCRIPTION OF THE DRAWINGS

FIG. 7 depicts an example of a table that includes a mapping of a code correction component used in the processes of FIG. 4 and FIG. 6, in accordance with embodiments of the present invention.

DETAILED DESCRIPTION

Overview

Figure 1:
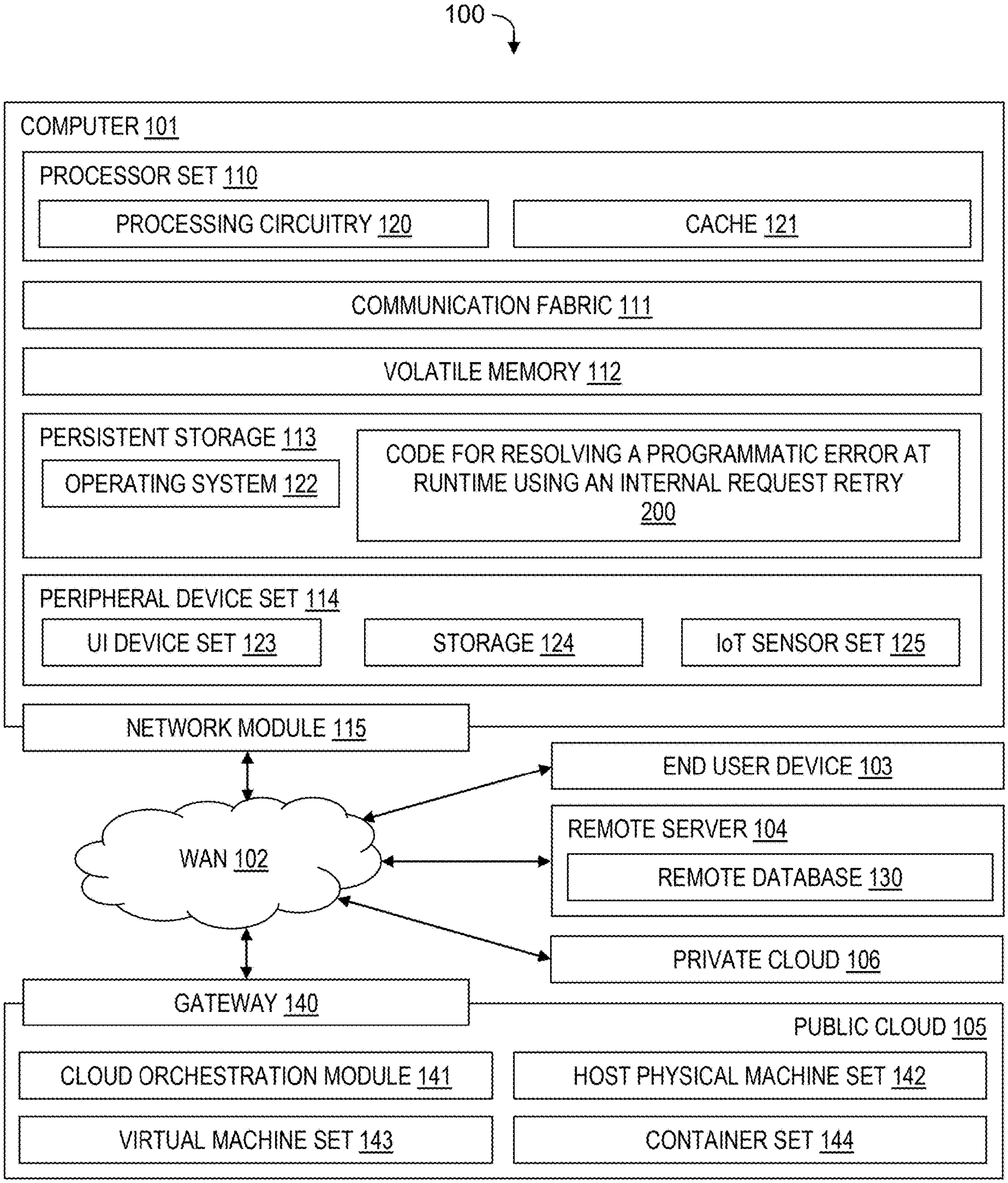
FIG. 1 is a block diagram of a system for resolving a programmatic error at runtime using an internal request retry, in accordance with embodiments of the present invention.

Monolithic applications and cloud native applications in cloud computing environments hosting representational state transfer (REST) application programming interfaces (APIs) are commonly included in the current technological landscape. These applications are written in programming languages, such as the Python®, JavaScript®, Go™, and Java® languages, etc. Python is a registered trademark of Python Software Foundation located in Beaverton, Oregon. JavaScript and Java are registered trademarks of Oracle America, Inc. located in Redwood Shores, California. Go is a trademark of Google LLC located in Mountain View, California, and is the subject of a trademark application that has been accepted by the United States Patent and Trademark Office.

The aforementioned applications fail due to several common programmatic errors, such as:

(i) missing or mismatched parentheses, brackets, or quotes
(ii) null pointer error
(iii) forgetting to use semicolons or colons to terminate statements or indicate block structure
(iv) misspelling keywords or identifiers
(v) incorrect indentation
(vi) misusing reserved words or symbols
(vii) incorrectly defining function or variable declarations
(viii) attempting to use unsupported or invalid characters in identifiers
(ix) performing operations on variables with incompatible data types
(x) writing loops that do not terminate properly
(xi) overflow or underflow errors resulting from arithmetic operations involving large numbers
(xii) incorrectly using arithmetic operators
(xiii) writing loops that never terminate
(xiv) failing to handle errors properly, such as neglecting to check return values from resource allocation functions or ignoring exceptions
(xv) failing to release external resources acquired by the program, such as network sockets, database connections, or system locks
(xvi) assigning or manipulating variables of incompatible data types
(xvii) passing incorrect number and data type arguments to a method Each of the aforementioned common programmatic errors can cause an overall computing system to become non-operable (i.e., experience downtime). For some APIs, uptime is more important than accuracy (e.g., gaming, news and media, social media, etc.).

Embodiments of the present invention address the aforementioned unique challenges by having the applications themselves detect a programmatic error in response to a client request, fix the error by generating corrected code at runtime, instantly deploy the corrected code at runtime, and internally perform a retry of the request at runtime after the deployment of the corrected code, without requiring a retry of the request by the client. To internally perform a retry of the request means that the retry of the request is performed within the application itself, without the client being aware of or having knowledge of the request retry. The client is also unaware and has no knowledge of the failure of the request and the fix and the deployment of the corrected code. Embodiments of the present invention provide a technique for detecting and resolving programmatic errors in cloud native applications and monolithic applications at runtime, and for the applications themselves to internally retry the API request after resolving the programmatic error, thereby increasing the uptime of the applications by preventing the applications from experiencing downtime as a result of the programmatic errors.

In one embodiment, a programmatic error resolution system fixes a breaking microservice and retries the Hypertext Transfer Protocol (HTTP) request, so that there is no rejection of the client request. The programmatic error resolution system fixes and redeploys the programmatic error on the fly.

In one embodiment, API owners decide which kinds of errors are allowed to be corrected and which other kinds of errors are not allowed to be corrected by the programmatic error resolution system described herein. The API owners can also configure the kinds of fixes which are solved by the programmatic error resolution system.

In one embodiment, the programmatic error resolution system described herein includes a configuration of metadata about the source code, where the system is configured to (i) perform the fix of specified programmatic errors, the redeployment of the corrected code generated by the fix, and the retry of the request automatically, or (ii) not perform the aforementioned fix of the specified errors, the redeployment, and the retry of the request. The aforementioned metadata includes, for example, (i) source code file names, (ii) class names, (iii) method names, (iv) error types, (v) object names, and (vi) number of errors. Dependencies are already present on the VM or container because the build/container is deployed with all the dependencies.

In one embodiment, the programmatic error resolution system described herein automatically creates pull requests in git for a development team to review the code fix and push or deploy an improved version of the application.

Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, computer-readable storage media (also called "mediums") collectively included in a set of one, or more, storage devices, and that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a block diagram of a system for resolving a programmatic error at runtime using an internal request retry, in accordance with embodiments of the present invention. Computing environment 100 contains an example of an environment for the execution of at least some of the computer code involved in performing the inventive methods, such as code 200 for resolving a programmatic error at runtime using an internal request retry. The aforementioned computer code is also referred to herein as computer-readable code, computer-readable program code, and machine readable code. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
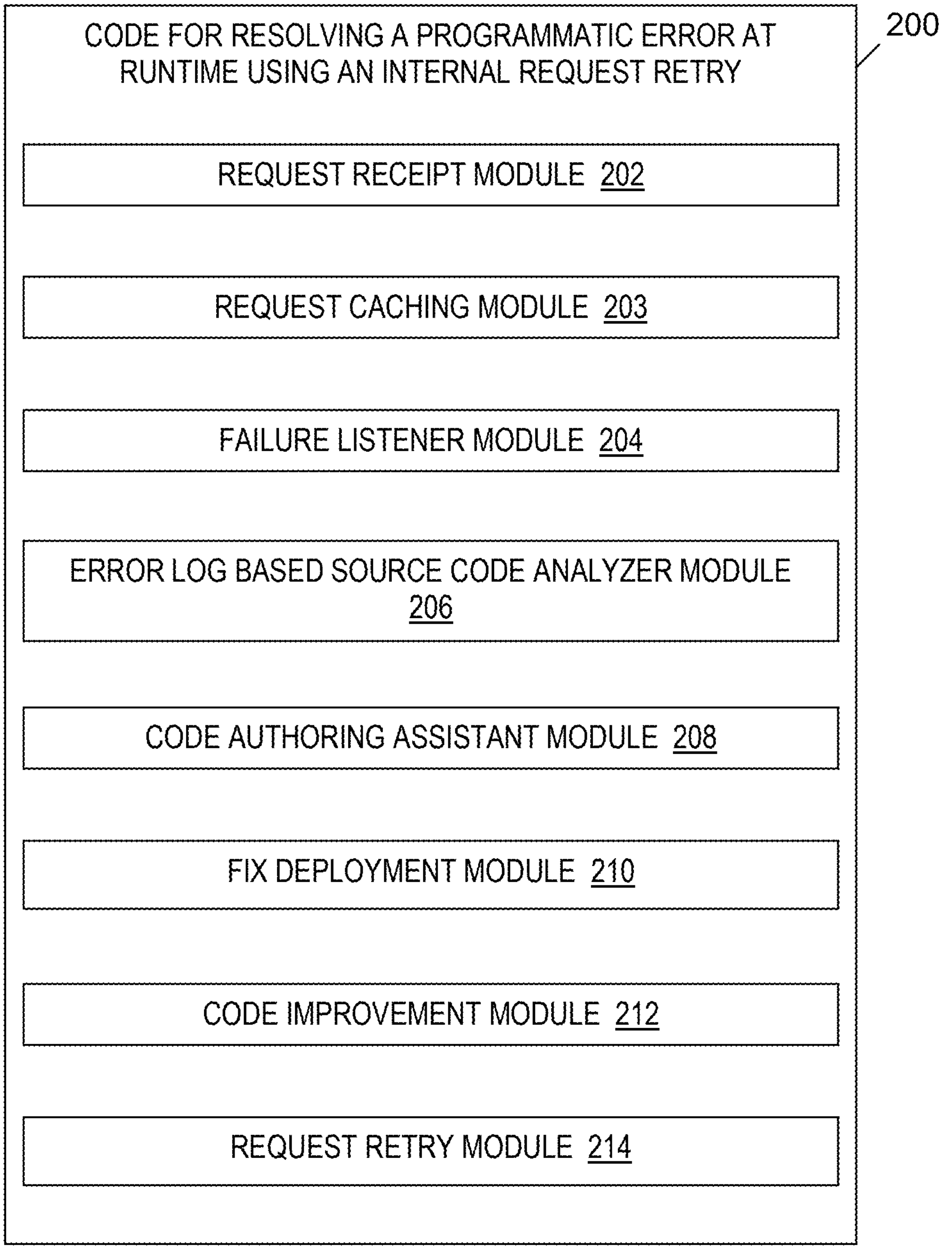
FIG. 2 is a block diagram of modules included in code included in the system of FIG. 1, in accordance with embodiments of the present invention.

System and Process for Resolving a Programmatic Error at Runtime Using an Internal Request Retry FIG. 2 is a block diagram of modules included in code 200 included in the system of FIG. 1, in accordance with embodiments of the present invention. Code 200 includes a request receipt module 202, a request caching module 203, a failure listener module 204, an error log based source code analyzer module 206, a code authoring assistant module 208, a fix deployment module 210, a code improvement module 212, and a request retry module 214.

Request receipt module 202 is configured to receive a request (i.e., HTTP request) from a client computing system (hereinafter referred to simply as a client), where the request is directed to an application programming interface (API) of a cloud native application or a monolithic application, where the cloud native application is hosted in a container included in a pod and the monolithic application is deployed in a virtual machine (VM).

Request caching module 203 is configured to cache the HTTP request received by request receipt module 202, where the caching of the HTTP request is triggered by the HTTP request entering the aforementioned pod or the VM. Caching the HTTP request includes, for example, storing the HTTP request within a log file.

Failure listener module 204 is configured to capture an error thrown by the monolithic application deployed in the VM or by a REST API of the cloud native application deployed in the container.

Error log based source code analyzer module 206 is configured to parse a log file or an available error description to extract information about the error captured by failure listener module 204, where the information includes, but is not limited to: (i) source code file location and name, (ii) source code line number where the error is occurring, (iii) error description, (iv) class name, and (v) method name Code authoring assistant module 208 is configured to receive the error description from error log based source code analyzer module 206 and fix the error in the source code on (i) the container that hosts the cloud native application or (ii) the VM in which the monolithic application is deployed. Fixing the error in the source code includes generating corrected code.

Fix deployment module 210 is configured to deploy the corrected code in (i) the container that hosts the cloud native application or (ii) the VM in which the monolithic application is deployed, where the corrected code is the result of the fix of the error performed by the code authoring assistant module 208.

Code improvement module 212 is configured to create a pull request in a git repository of the cloud native application hosted in the container or the monolithic application deployed in the VM, with the corrected code applied in the cloud native or monolithic application, so that an application development team can review and improve the corrected code, merge the corrected code with the cloud native or monolithic application, and, if needed, deploy a newer version of the cloud native or monolithic application, where the newer version includes the corrected code.

Request retry module 214 is configured to retrieve the HTTP request from the request's cached location (e.g., log file) and retry the HTTP request after the corrected code (i.e., code fix) is deployed on the container hosting the cloud native application or the VM in which the monolithic application is deployed.

The functionality of the modules included in code 200 is described in more detail in the discussions presented below relative to FIG. 3, FIG. 4, FIG. 5, FIG. 6, and FIG. 7.

Figure 3:
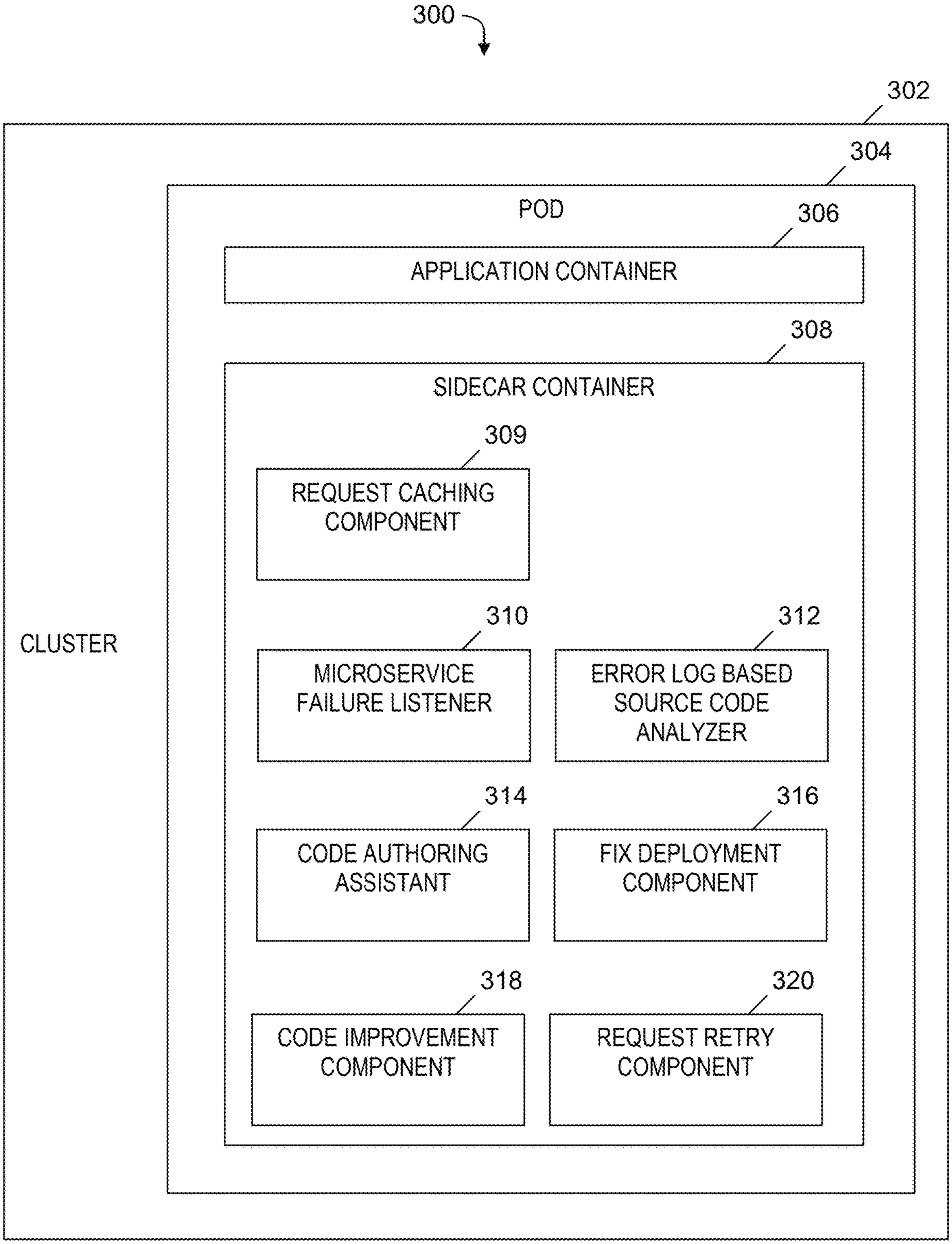
FIG. 3 is a block diagram of a system for resolving a programmatic error at runtime in a microservice, in accordance with embodiments of the present invention.

FIG. 3 is a block diagram of a system 300 for resolving a programmatic error at runtime in a microservice included in a cloud native application, in accordance with embodiments of the present invention. System 300 includes a cluster 302 of computing nodes that run containerized applications. For example, cluster 302 is a Kubernetes® cluster. Kubernetes is a registered trademark of the Linux Foundation located in San Francisco, California. Cluster 302 includes a pod 304, which includes an application container 306 and a sidecar container 308. In one embodiment, application container 306 is a single application or a microservice packaged with its dependencies. Sidecar container includes the following components: (i) a request caching component 309, (ii) a microservice failure listener 310, (iii) an error log based source code analyzer 312, (iv) a code authoring assistant 314, (v) a fix deployment component 316, (vi) a code improvement component 318, and (vii) a request retry component 320.

Request caching component 309 caches a HTTP request which is received by request receipt module 202, where the caching is triggered in response to the HTTP request entering pod 304. In one embodiment, request caching component 309 is implemented by request caching module 203.

Microservice failure listener 310 captures any error thrown by the REST API deployed in application container 306, where the error is in response to a HTTP request from a client. In one embodiment, microservice failure listener 310 is implemented by failure listener module 204.

Error log based source code analyzer 312 parses the log file or the description of the error captured by microservice failure listener 310 to extract information which includes, but is not limited to: (i) source code file location and name, (ii) source code line number where the error is occurring, (iii) error description, (iv) class name, and (v) method name. In one embodiment, error log based source code analyzer 312 is implemented by error log based source code analyzer module 206.

Code authoring assistant 314 receives the error description from error log based source code analyzer 312. Code authoring assistant 314 generates corrected code which fixes the error in the source code in the application or microservice hosted on application container 306. In one embodiment, code authoring assistant 314 is implemented by code authoring assistant module 208.

Fix deployment component 316 deploys the corrected code in application container 306, which hosts the application or microservice which is fixed by the corrected code generated by code authoring assistant 314. In one embodiment, fix deployment component 316 is implemented by fix deployment module 210.

Code improvement component 318 creates a pull request in a git repository of the application or microservice deployed in application container 306, which includes the corrected code applied in the application or microservice. The creation of the pull request allows an application development team to be able to review, improve, and merge the corrected code, and if needed, deploy a new version of the application or microservice that includes the corrected code as a code fix. In one embodiment, code improvement component 318 is implemented by code improvement module 212.

Request retry component 320 retrieves the HTTP request from the HTTP request's cached location (e.g., a log file) and retries the retrieved HTTP request after the corrected code is deployed on application container 306 by fix deployment component 316. In one embodiment, request retry component 320 is implemented by request retry module 214.

Figure 4:
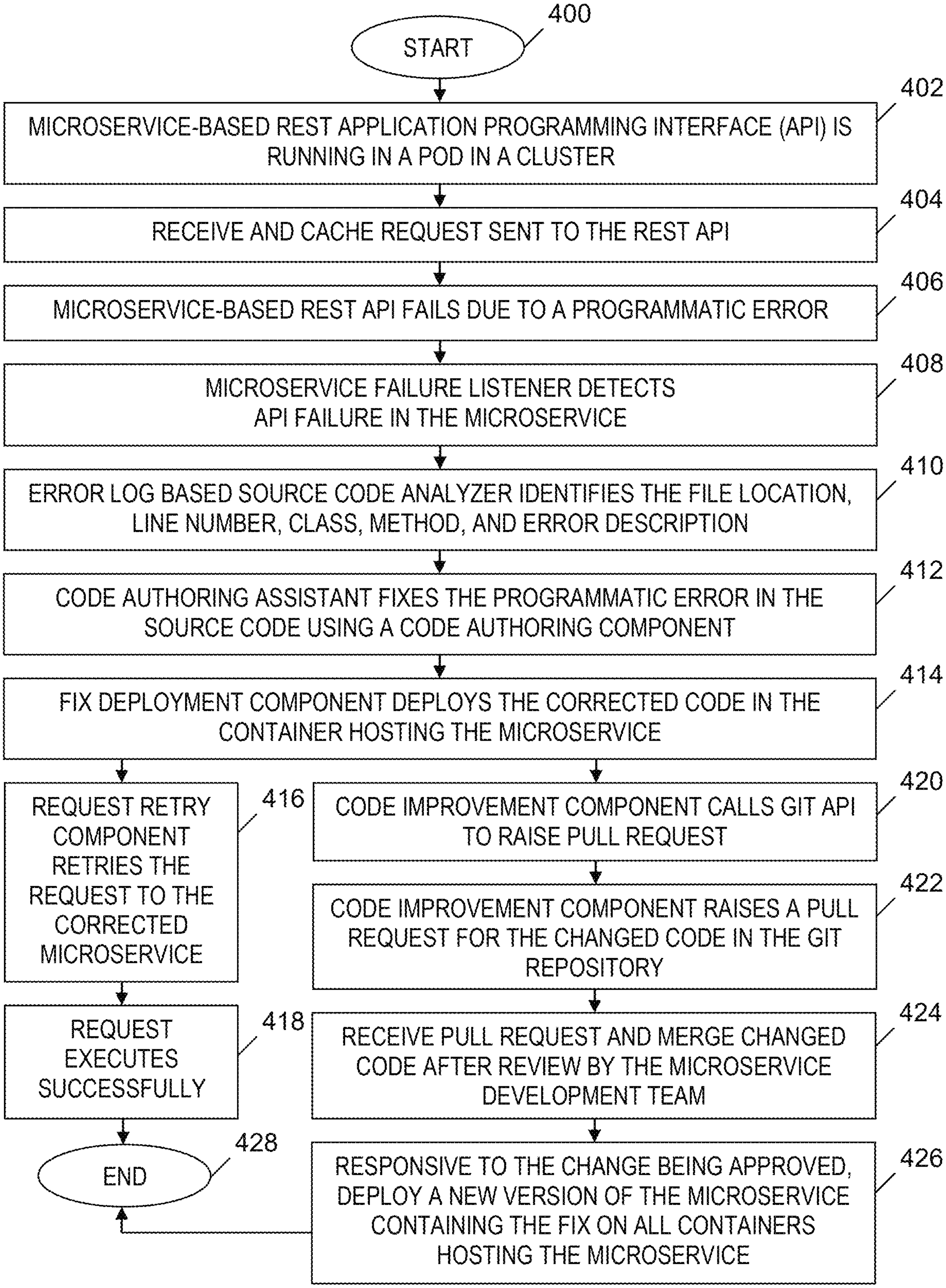
FIG. 4 is a flowchart of a process of resolving a programmatic error at runtime in a microservice, where operations of the flowchart are performed by modules in FIG. 2, which are implemented by the system of FIG. 3, in accordance with embodiments of the present invention.

FIG. 4 is a flowchart of a process of resolving a programmatic error at runtime in a microservice, where operations of the flowchart are performed by components in FIG. 3, which are implemented by modules in FIG. 2, in accordance with embodiments of the present invention. The process of FIG. 4 begins at a start node 400. In step 402, a microservice is running in application container 306, which is included in pod 304, which is in cluster 302 (e.g., a Kubernetes® cluster). The application container 306 hosts a REST API (e.g., a REST API written in code the Python® language). Sidecar container 308 is also deployed in the same pod 304 and includes the components shown in FIG. 3. In another embodiment, the components included in sidecar container 308 are deployed as a DaemonSet.

In step 404, request receipt module 202 receives a HTTP request that was sent by a client to the aforementioned REST API. Receiving the HTTP request in step 404 includes the HTTP request entering pod 304. In response to the HTTP request being received and entering pod 304, request caching component 309 caches the HTTP request (e.g., stores the request in a log file).

In step 406, the microservice-based REST API fails due to a programmatic error responsive to the HTTP request. For example, the REST API encounters a NullPointerException error while serving the HTTP request.

In step 408, microservice failure listener 310 detects an API failure in the microservice. In one embodiment, failure listener module 204 performs step 408.

In step 410, error log based source code analyzer 312 identifies the file location, line number where the REST API failed, class, method, and error description associated with the programmatic error by extracting this information from a log file. In one embodiment, error log based source code analyzer module 206 performs step 410.

In step 412, code authoring assistant 314 (*i*) uses a code authoring component included in code authoring assistant 314 to generate corrected code and (ii) fixes the programmatic error in the source code by using the corrected code. The corrected code is also referred to herein as "changed code," "code fix," and "fix." For example, code authoring assistant 314 adds a NullPointerException check at the point where the code break occurred to avoid the NullPointerException. In one embodiment, code authoring assistant module 208 performs step 412.

In step 414, fix deployment component 316 deploys the corrected code in application container 306 which is hosting the microservice. In one embodiment, fix deployment module 210 performs step 414. Following step 414, the process of FIG. 4 continues with a branch of steps starting at step 416 and another, parallel branch of steps starting at step 420, where the branches of steps are described below.

In step 416, request retry component 320 retrieves the HTTP request from the HTTP request's cached location (e.g., log file) and retries the same HTTP request to application container 306 which is hosting the microservice in pod 304 and in which the corrected code is deployed. In one embodiment, request retry module 214 performs step 416.

In step 418, the HTTP request executes successfully in response to the retry performed in step 416. For example, the retried request passes this time without the NullPointerException.

In step 420, which follows step 414, code improvement component 318 calls a git API (i.e., an API in a git repository) to raise (i.e., create) a pull request. In step 422, code improvement component 318 raises the pull request for the changed code in the git repository. In step 424, code improvement component 318 receives the pull request and merges the changed code after a review by a microservice development team. In step 426, responsive to the changed code being approved by the microservice development team, code improvement component 318 deploys a new version of the microservice containing the corrected code on all containers that host the microservice. In one embodiment, code improvement module 212 performs steps 420, 422, 424, and 426. In other embodiments, steps 420, 422, 424, and 426 are not limited to a git API and a git repository, but instead are described by reference to an API and a repository of another distributed version control system that controls the source code.

Following step 418 and step 426, the process of FIG. 4 ends at an end node 428.

Figure 5:
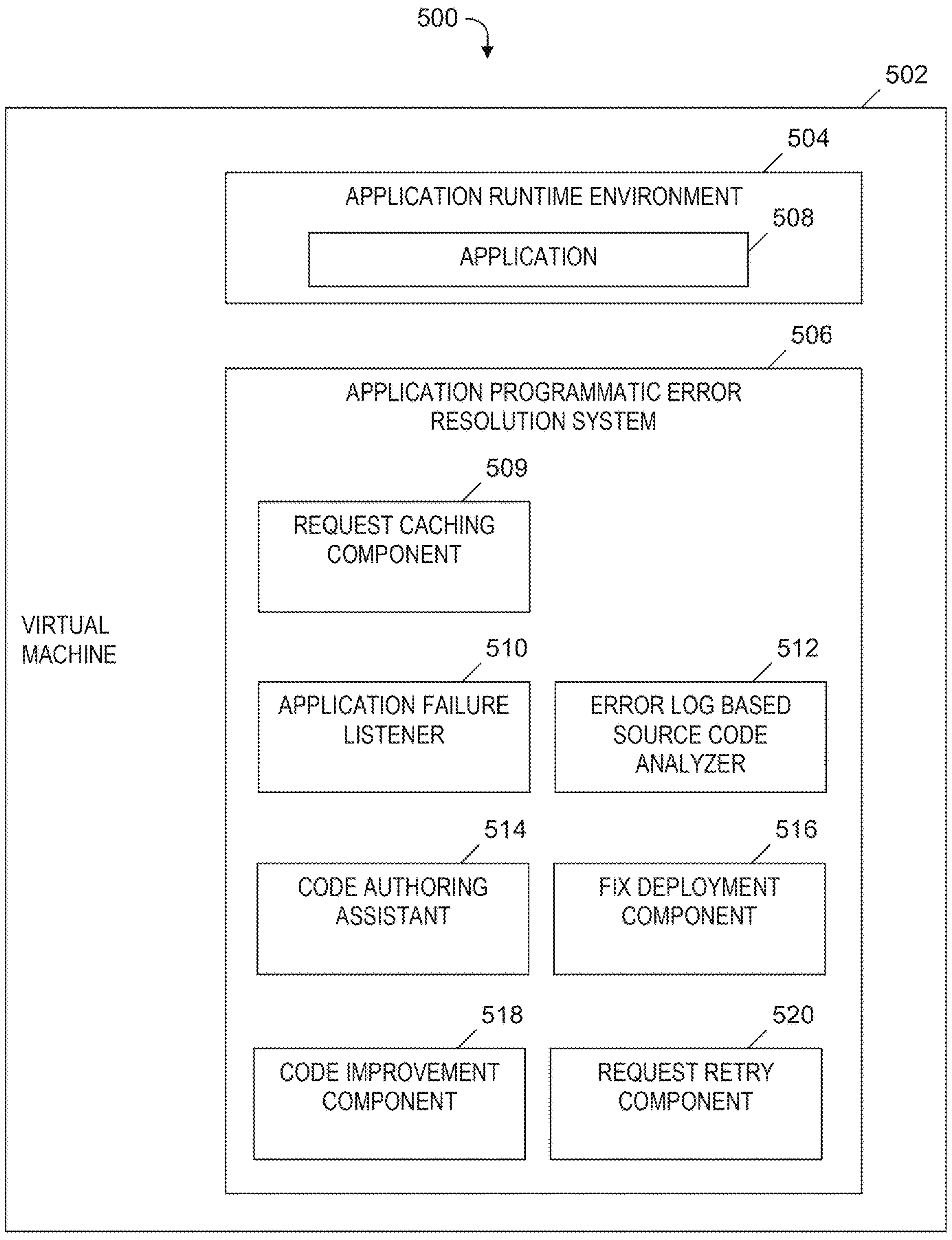
FIG. 5 is a block diagram of a system for resolving a programmatic error at runtime in an application running in an application runtime environment set in a virtual machine, in accordance with embodiments of the present invention.

FIG. 5 is a block diagram of a system 500 for resolving a programmatic error at runtime in an application running in an application runtime environment set in a virtual machine, in accordance with embodiments of the present invention. System 500 includes a virtual machine 502. An application runtime environment 504 is set in virtual machine 502. Virtual machine 502 includes an application programmatic error resolution system 506.

Application runtime environment 504 includes an application 508, which has a HTTP API (e.g., a HTTP API developed in the Python® language) running in application runtime environment 504.

Application programmatic error resolution system 506 includes the following components: (i) a request caching component, (ii) an application failure listener 510, (iii) an error log based source code analyzer 512, (iv) a code authoring assistant 514, (v) a fix deployment component 516, (vi) a code improvement component 518, and (vii) a request retry component 520.

Request caching component 509 caches a HTTP request which is received by request receipt module 202, where the caching is triggered in response to the HTTP request entering virtual machine 502. In one embodiment, request caching component 509 is implemented by request caching module 203.

Application failure listener 510 captures any error thrown by application 508 deployed in virtual machine 502, where the error is in response to a HTTP request from a client. In one embodiment, application failure listener 510 is implemented by failure listener module 204.

Error log based source code analyzer 512 parses the log file or the description of the error captured by application failure listener 510 to extract information which includes, but is not limited to: (i) source code file location and name, (ii) source code line number where the error is occurring, (iii) error description, (iv) class name, and (v) method name. In one embodiment, error log based source code analyzer 512 is implemented by error log based source code analyzer module 206.

Code authoring assistant 514 receives the error description from error log based source code analyzer 512. Code authoring assistant 514 generates corrected code which fixes the error in the source code in the application hosted on virtual machine 502. In one embodiment, code authoring assistant 514 is implemented by code authoring assistant module 208.

Fix deployment component 516 deploys the corrected code in virtual machine 502, which hosts application 508, which is fixed by the corrected code generated by code authoring assistant 514. In one embodiment, fix deployment component 516 is implemented by fix deployment module 210.

Code improvement component 518 creates a pull request in a git repository of application 508 deployed in virtual machine 502, which includes the corrected code applied in application 508. The creation of the pull request allows an application development team to be able to review, improve, and merge the corrected code, and if needed, deploy a new version of application 508 that includes the corrected code as a code fix. In one embodiment, code improvement component 518 is implemented by code improvement module 212.

Request retry component 520 retrieves the HTTP request from the HTTP request's cached location (e.g., a log file) and retries the HTTP request after the corrected code is deployed in virtual machine 502 by fix deployment component 516. In one embodiment, request retry component 520 is implemented by request retry module 214.

Figure 6:
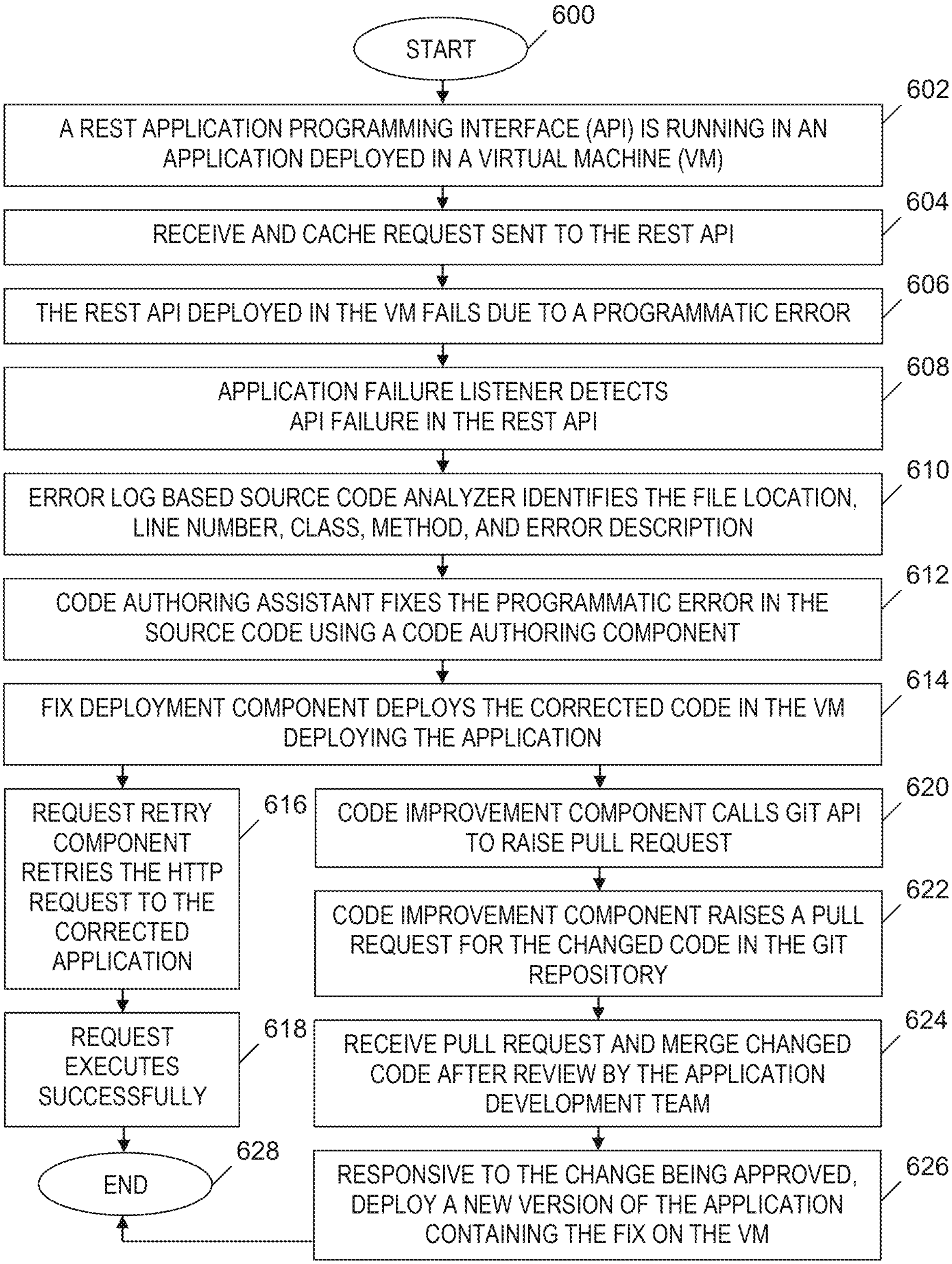
FIG. 6 is a flowchart of a process of resolving a programmatic error at runtime in an application running in an application runtime environment set in a virtual machine, where operations of the flowchart are performed by modules in FIG. 2, which are implemented by the system of FIG. 5, in accordance with embodiments of the present invention.

FIG. 6 is a flowchart of a process of resolving a programmatic error at runtime in an application (e.g., monolithic application) running in an application runtime environment set in a virtual machine, where operations of the flowchart are performed by components in the system of FIG. 5, which are implemented by modules in FIG. 2, in accordance with embodiments of the present invention. The process of FIG. 6 begins at a start node 600. Application 508 is a monolithic application running in application runtime environment 504, which is set in virtual machine 502. Application 508 has a HTTP API (e.g., an HTTP API developed in the Python® language) running in application runtime environment 504. Application programmatic error resolution system 506 is also deployed in the same virtual machine 502 and includes the components shown in FIG. 5. In another embodiment, the components included in application programmatic error resolution system 506 are deployed as a software as a service (SaaS).

In step 602, a REST API is running in application 508, where the REST API is deployed in virtual machine 502.

In step 604, request receipt module 202 receives a HTTP request that was sent by a client to the aforementioned REST API. Receiving the HTTP request in step 604 includes the HTTP request entering virtual machine 502. In response to the HTTP request being received and entering virtual machine 502, request caching component 509 caches the HTTP request (e.g., stores the request in a log file).

In step 606, the REST API fails due to a programmatic error responsive to the HTTP request received in step 604. For example, the REST API encounters a NullPointerException error while serving the HTTP request.

In step 608, application failure listener 510 detects an API failure in the REST API. In one embodiment, failure listener module 204 performs step 608.

In step 610, error log based source code analyzer 512 identifies the file name and file location, line number where the REST API failed, class, method, and error description associated with the programmatic error by extracting this information from a log file. In one embodiment, error log based source code analyzer module 206 performs step 610.

In step 612, code authoring assistant 514 (*i*) uses a code authoring component included in code authoring assistant 514 to generate corrected code and (ii) fixes the programmatic error in the source code by using the corrected code. For example, code authoring assistant 514 adds a NullPointerException check at the point where the code break occurred to avoid the NullPointerException. In one embodiment, code authoring assistant module 208 performs step 612.

In step 614, fix deployment component 516 deploys the corrected code in virtual machine 502 deploying application 508. In one embodiment, fix deployment module 210 performs step 614. Following step 614, the process of FIG. 6 continues with a branch of steps starting at step 616 and another, parallel branch of steps starting at step 620, where the branches of steps are described below.

In step 616, request retry component 520 retrieves the HTTP request from the HTTP request's cached location (e.g., log file) and retries the same HTTP request to the corrected application (i.e., application 508, in which the corrected code is deployed in step 614, which is deployed in virtual machine 502, and which hosts the aforementioned REST API). In one embodiment, request retry module 214 performs step 616.

In step 618, the HTTP request executes successfully in response to the retry performed in step 616. For example, the retried request passes this time without the NullPointerException.

In step 620, which follows step 614, code improvement component 518 calls a git API (i.e., an API in a git repository) to raise (i.e., create) a pull request. In step 622, code improvement component 518 raises the pull request for the changed code in the git repository. In step 624, code improvement component 518 receives the pull request and merges the changed code after a review by an application development team. In step 626, responsive to the changed code being approved by the application development team, code improvement component 518 deploys a new version of application 508 (i.e., application 508 containing the corrected code) on virtual machine 502. In one embodiment, code improvement module 212 performs steps 620, 622, 624, and 626. In other embodiments, steps 620, 622, 624, and 626 are not limited to a git API and a git repository, but instead are described by reference to an API and a repository of another distributed version control system that controls the source code.

Following step 618 and step 626, the process of FIG. 6 ends at an end node 628.

EXAMPLES

FIG. 7 depicts an example of a table 700 that includes a mapping of a code correction component used in the processes of FIG. 4 and FIG. 6, in accordance with embodiments of the present invention. Table 700 illustrates an example of a code correction component that contains a datastore that includes a mapping that associates different types of programmatic errors (e.g., table entries in the Error Type column) for each language in a group of supported languages (e.g., table entries in the Language column), and further associates information about correction components (e.g., table entries in the Fixed by Component column) for each type of programmatic error for each language. A given correction component in the Fixed by Component column in table 700 specifies a correction component utilizing a particular technology that fixes a programmatic error whose type and language are the corresponding entries in the Error Type and Language columns of table 700, respectively. As one example, the first row of entries in table 700 indicates that an error of a Nullpointer error type in Language A is fixed by a rule in a Rule Engine specified by RuleEngine-LangA-Rule1. As another example, the fourteenth row of entries in table 700 indicates that an error of a Datatype Conversion Error type in Language B is fixed by an artificial intelligence (AI) engine specified by AIEngine-LangB-Rule4.

In one embodiment, generating the fix of the programmatic error in step 412 includes (i) the code authoring component (included in code authoring assistant 314) identifying a correction component to fix the programmatic error by performing a lookup in the mapping in the aforementioned datastore, where the mapping associates the error types of programmatic errors, languages of the programmatic errors, and correction components, as illustrated by the example in table 700; and (ii) the code authoring assistant 314 triggering the identified correction component to fix the programmatic error. In one embodiment, the code authoring component included in code authoring assistant 314 includes the aforementioned datastore.

In another embodiment, generating the fix of the programmatic error in step 614 includes (i) the code authoring component (included in code authoring assistant 514) identifying a correction component to fix the programmatic error by performing a lookup in the mapping in the aforementioned datastore, where the mapping associates the error types of programmatic errors, languages of the programmatic errors, and correction components, as illustrated by the example in table 700; and (ii) the code authoring assistant 514 triggering the identified correction component to fix the programmatic error. In one embodiment, the code authoring component included in code authoring assistant 514 includes the aforementioned datastore.

The descriptions of the various embodiments of the present invention have been presented herein for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving a request from a client directed to an application programming interface (API) of one of (i) a cloud native application hosted in a container included in a pod or (ii) a monolithic application deployed in a virtual machine (VM);

detecting, based on the request, a failure of the API due to a programmatic error in one of the cloud native application or the monolithic application;

generating, based on the detecting of the failure of the API, a fix of the programmatic error in a source code of one of the cloud native application or the monolithic application, wherein the fix is a changed code associated with the source code;

deploying the fix in one of the container or the VM, wherein the generating of the fix and the deploying of the fix are performed within a runtime execution of the cloud native application by components inside the pod hosting the cloud native application, or within a runtime execution of the monolithic application by components inside the VM deploying the monolithic application; and retrying the request to one of (i) the cloud native application corrected by the fix deployed in the container or (ii) the monolithic application corrected by the fix deployed in the VM, wherein the retrying is performed by the components inside the pod or by the components inside the VM.

2. The computer-implemented method of claim 1, further comprising:

calling, by a code improvement component and based on the deploying of the fix, a git API;

creating, based on the calling, a pull request for the changed code in a git repository; and subsequent to a review by a development team and a merge of the changed code into a new version of the cloud native application or the monolithic application, deploying the new version in one of (i) multiple containers hosting the cloud native application or (ii) the VM.

3. The computer-implemented method of claim 1, further comprising: preventing a downtime of the cloud native application or the monolithic application, based on:

the retrying of the request by the components inside the pod or by the components inside the VM, and the generating of the fix and the deploying of the fix within the runtime execution of the cloud native application or within the runtime execution of the monolithic application.

4. The computer-implemented method of claim 1, wherein the retrying the request is performed without requiring a receipt of an additional request from the client based on the detected failure, without requiring a retry of the request by the client, and without the client having a knowledge of the failure or the fix.

5. The computer-implemented method of claim 1, wherein the generating the fix of the programmatic error includes:

identifying, by a code authoring component, a correction component to fix the programmatic error, wherein the correction component is identified by performing a lookup in a mapping in a datastore, the performing of the lookup is based on an error type of the programmatic error and a language of the programmatic error, the mapping associates error types of programmatic errors, languages of the programmatic errors, and correction components, the programmatic errors include the programmatic error, and the code authoring component includes the datastore.

6. The computer-implemented method of claim 5, wherein the generating the fix of the programmatic error further includes:

triggering the identified correction component to fix the programmatic error.

7. A computer system, comprising:

a processor set;

one or more computer-readable storage media; and program instructions stored on the one or more computer-readable storage media to cause the processor set to perform operations comprising:

receiving a request from a client directed to an application programming interface (API) of one of (i) a cloud native application hosted in a container included in a pod or (ii) a monolithic application deployed in a virtual machine (VM);

detecting, based on the request, a failure of the API due to a programmatic error in one of the cloud native application or the monolithic application;

generating, based on the detecting of the failure of the API, a fix of the programmatic error in a source code of one of the cloud native application or the monolithic application, wherein the fix is a changed code associated with the source code;

deploying the fix in one of the container or the VM, wherein the generating of the fix and the deploying of the fix are performed within a runtime execution of the cloud native application by components inside the pod hosting the cloud native application, or within a runtime execution of the monolithic application by components inside the VM deploying the monolithic application; and retrying the request to one of (i) the cloud native application corrected by the fix deployed in the container or (ii) the monolithic application corrected by the fix deployed in the VM, wherein the retrying is performed by the components inside the pod or the components inside the VM.

8. The computer system of claim 7, wherein the operations further comprise:

calling, by a code improvement component and based on the deploying of the fix, a git API;

creating, based on the calling, a pull request for the changed code in a git repository; and subsequent to a review by a development team and a merge of the changed code into a new version of the cloud native application or the monolithic application, deploying the new version in one of (i) multiple containers hosting the cloud native application or (ii) the VM.

9. The computer system of claim 7, wherein the operations further comprise: preventing a downtime of the cloud native application or the monolithic application, based on:

the retrying of the request by the components inside the pod or by the components inside the VM, and the generating of the fix and the deploying of the fix within the runtime execution of the cloud native application or within the runtime execution of the monolithic application.

10. The computer system of claim 7, wherein the retrying the request is performed without requiring a receipt of an additional request from the client based on the detected failure, without requiring a retry of the request by the client, and without the client having a knowledge of the failure or the fix.

11. The computer system of claim 7, wherein the generating the fix of the programmatic error includes:

identifying, by a code authoring component, a correction component to fix the programmatic error, wherein the correction component is identified by performing a lookup in a mapping in a datastore, the performing of the lookup is based on an error type and a language of the programmatic error, the mapping associates error types of programmatic errors, languages of the programmatic errors, and correction components, the programmatic errors include the programmatic error, and the code authoring component includes the datastore.

12. The computer system of claim 11, wherein the generating the fix of the programmatic error further includes:

triggering the identified correction component to fix the programmatic error.

13. A computer program product, comprising:

one or more computer-readable storage media; and program instructions stored on the one or more computer-readable storage media to perform operations comprising:

receiving a request from a client directed to an application programming interface (API) of one of (i) a cloud native application hosted in a container included in a pod or (ii) a monolithic application deployed in a virtual machine (VM);

detecting, based on the request, a failure of the API due to a programmatic error in one of the cloud native application or the monolithic application;

generating, based on the detecting of the failure of the API, a fix of the programmatic error in a source code of one of the cloud native application or the monolithic application, wherein the fix is a changed code associated with the source code;

deploying the fix in one of the container or the VM, wherein the generating of the fix and the deploying of the fix are performed within a runtime execution of the cloud native application by components inside the pod hosting the cloud native application, or within a runtime execution of the monolithic application by components inside the VM deploying the monolithic application; and retrying the request to one of (i) the cloud native application corrected by the fix deployed in the container or (ii) the monolithic application corrected by the fix deployed in the VM, wherein the retrying is performed by the components inside the pod or the components inside the VM.

14. The computer program product of claim 13, wherein the operations further comprise:

calling, by a code improvement component and based on the deploying of the fix, a git API;

creating, based on the calling, a pull request for the changed code in a git repository; and subsequent to a review by a development team and a merge of the changed code into a new version of the cloud native application or the monolithic application, deploying the new version in one of (i) multiple containers hosting the cloud native application or (ii) the VM.

15. The computer program product of claim 13, wherein the operations further comprise: preventing a downtime of the cloud native application or the monolithic application, based on:

the retrying of the request by the components inside the pod or by the components inside the VM, and the generating of the fix and the deploying of the fix within the runtime execution of the cloud native application or within the runtime execution of the monolithic application.

16. The computer program product of claim 13, wherein the retrying the request is performed without requiring a receipt of an additional request from the client based on the detected failure, without requiring a retry of the request by the client, and without the client having a knowledge of the failure or the fix.

17. The computer program product of claim 13, wherein the generating the fix of the programmatic error includes:

identifying, by a code authoring component, a correction component to fix the programmatic error by, wherein the correction component is identified performing a lookup in a mapping in a datastore, the performing of the lookup is based on an error type and a language of the programmatic error, the mapping associates error types of programmatic errors, languages of the programmatic errors, and correction components, the programmatic errors include the programmatic error, and the code authoring component includes the datastore.

* * * * *